US008143852B2

(12) United States Patent
Murao

(10) Patent No.: US 8,143,852 B2

(45) Date of Patent: Mar. 27, 2012

(54) STATE OF CHARGE OPTIMIZING DEVICE AND ASSEMBLED BATTERY SYSTEM INCLUDING SAME

(75) Inventor: Hiroya Murao, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 729 days.

(21) Appl. No.: 12/237,428

(22) Filed: Sep. 25, 2008

(65) Prior Publication Data

US 2009/0085520 A1 Apr. 2, 2009

(30) Foreign Application Priority Data

Sep. 27, 2007 (JP) ................................ 2007-251384

(51) Int. Cl.
*H02J 7/00* (2006.01)
*G01N 27/416* (2006.01)

(52) U.S. Cl. ........ 320/118; 320/112; 320/116; 320/121; 320/122; 320/132; 324/427; 324/434

(58) Field of Classification Search .................. 320/132, 320/118

See application file for complete search history.

(56) References Cited

U.S. PATENT DOCUMENTS 5,644,212 A 7/1997 Takahashi
5,889,385 A * 3/1999 Podrazhansky et al. ...... 320/130
5,905,360 A 5/1999 Ukita
2003/0062874 A1* 4/2003 Furukawa .................... 320/121
2004/0018419 A1* 1/2004 Sugimoto et al. ............... 429/61
2004/0135546 A1 7/2004 Chertok et al.
2006/0097698 A1 5/2006 Plett
2008/0036424 A1* 2/2008 Saigo ........................... 320/136

FOREIGN PATENT DOCUMENTS

JP 2000-312443 A 11/2000
JP 2001-218376 A 8/2001
JP 2001-231178 A 8/2001
JP 2007-244142 A 9/2007

* cited by examiner

*Primary Examiner* — Edward Tso
*Assistant Examiner* — Johali Torres Ruiz
(74) *Attorney, Agent, or Firm* — Marvin A. Motsenbocker; Mots Law, PLLC

(57) ABSTRACT

A state of charge optimizing device according to the present invention optimizes a state of charge of each of a plurality of cells which are connected in series to form an assembled battery, and conducts the optimization by discharging or charging a part or all of the plurality of cells so that the differences between the amount of charge after the optimization and the amount of charge in a predetermined state of charge become uniform.

3 Claims, 10 Drawing Sheets

2
1
R
21
22
V
SW
LOAD
3
20
CONTROL CIRCUIT

STATE OF CHARGE OPTIMIZING DEVICE AND ASSEMBLED BATTERY SYSTEM INCLUDING SAME

The priority application Number 2007-251384, upon which this patent application is based, is hereby incorporated by reference.

BACKGROUND OF THE INVENTION

1. Field of the Invention

The present invention relates to devices optimizing the states of charge of a plurality of cells that form an assembled battery, and assembled battery systems including the devices.

2. Description of Related Art

In recent years, an assembled battery has been widely used, for example an assembled battery including a plurality of lithium-ion secondary cells connected in series is used in a hybrid vehicle as a power source. Discharge power of an assembled battery is limited by a cell with the lowest state of charge (SOC) among a plurality of cells that forms the assembled battery. Therefore, performance of an assembled battery decreases due to the variation of SOC of the plurality of cells that form the assembled battery.

Accordingly, a process to equalize the SOCs of the plurality of cells of the battery is required. In a conventional equalizing process, the voltages across the respective cells that form an assembled battery (open-circuit voltages) are detected, and the lowest value or the average value of the detected cell voltages is used as a target value for the equalizing. Thus, electric discharge is conducted on the cell whose voltage is above the target value for equalizing, thereby equalizing the SOCs of the plurality of cells that form the assembled battery.

For example, as shown in FIG. 10 in which three cells 1 to 3 form an assembled battery, when the SOC of the cell 1 is the lowest before equalizing, the cells 2 and 3 are discharged to the SOC of the cell 1, thereby equalizing the SOC of the cells 1 to 3.

However, the inventor of the present invention has discovered in his research that the full charging capacities of the plurality of cells that form the assembled battery vary due to the variation as-manufactured, or the variation attributed to temperature distribution when used, and therefore, the conventional equalizing process cannot sufficiently elicit the performance of the assembled battery.

For example, as shown in FIG. 11, in which three cells 1 to 3 having different full charging capacities form an assembled battery, in the case where the cells 1 to 3 are equalized when the SOC of the cells is approximately 70 percent, since the discharge amounts per unit time of the cells 1 to 3 are uniform, when the SOC of the cell 1 reaches 50 percent due to discharge of the assembled battery after the equalization, the SOC of the cells 1 to 3 varies.

Also, in the case where the cells 1 to 3 are equalized when the SOC of the cells is approximately 30 percent, since the charge amounts per unit time of the cells 1 to 3 are uniform, when the SOC of the cell 1 reaches 50 percent due to charge of the assembled battery after the equalization, the SOCs of the cells 1 to 3 vary.

The discharge characteristic of the battery decreases as the SOC decreases, and the charge characteristic decreases as the SOC increases as shown in FIG. 12. Therefore, the higher performance of the assembled battery can be obtained when the SOCs of the plurality of cells are equalized with the SOC in which both the discharge characteristic and charge characteristic are favourable and well balanced, such as approximately 50 percent, rather than with a high or low SOC.

With the conventional equalizing process, in the case where the SOCs of a plurality of cells are equalized when the SOC is approximately 70 percent as described above, for example, since the SOCs of the cells vary when the SOC of the cells decreases to around 50 percent due to discharge of the assembled battery after the equalization, the performance of the assembled battery cannot be sufficiently elicited.

Accordingly, the equalization with the SOC of the plurality of cells of around 50 percent is considered. It is desirable to equalize the assembled battery of a hybrid car or the like when the car is stopped and the battery is not charged or discharged in order to accurately measure the amount of charge. However, the hybrid car or the like is not necessarily stopped when the SOC of the assembled battery is around 50 percent. It is therefore problematic to do the equalization when the car is stopped in that the equalization is done very infrequently.

SUMMARY OF THE INVENTION

An object of the present invention is to provide a state of charge optimizing device capable of sufficiently eliciting the performance of an assembled battery that includes a plurality of cells with different full charging capacities and an assembled battery system including the device.

A state of charge optimizing device according to the present invention is a device optimizing the state of charge of each of a plurality of cells connected in series to form an assembled battery, and the device sets an equalization target value in view of the full charging capacity for each of a part or all of the cells to equalize the battery by discharging or charging each of the cells in accordance with the set equalization target value.

In particular, the equalization target value is set to the amount of charge, or a value corresponding thereto, such that the difference between the amount of charge after optimization and the amount of charge in a predetermined state of charge is uniform among the plurality of cells.

According to the state of charge optimizing device of the present invention, after optimization, the difference between the amount of charge at the time and the amount of charge in the predetermined state of charge is uniform among the plurality of cells that form an assembled battery. Therefore, when the assembled battery is discharged or charged thereafter, the states of charge of the plurality of cells will be uniform in the predetermined state of charge. Here, the predetermined state of charge is set to a state of charge in which both the discharge characteristic and charge characteristic of the assembled battery are preferable and well balanced, such as 40 to 60 percent to sufficiently elicit the performance of the assembled battery.

In particular, the state of charge optimizing device of the present invention comprises:

a charging and discharging unit capable of charging and/or discharging each of the cells;

an amount of charge difference calculating unit calculating the difference between the current amount of charge and the amount of charge in the predetermined state of charge for at least one of the plurality of cells;

an optimization target value setting unit setting an optimization target value in accordance with the amount of charge difference calculated by the amount of charge difference calculating unit for each of a part or all of the plurality of cells; and an optimizing processing unit making the charge and discharge unit conduct charging or discharging in accordance with the set optimization target value for each of a part or all of the plurality of cells when the optimization target value is set.

According to the particular configuration described above, the optimization target value set for each of the cells is an amount of charge, or a value corresponding thereto, close to the amount of charge at the time. Therefore, the charge or discharge amount can be small.

Also in particular, the optimization target value setting unit sets the optimization target value for each of the cells other than a reference cell which is the at least one cell of the plurality of cells, and comprises:

a first processing unit adding the amount of charge difference of the reference cell calculated by the amount of charge difference calculating unit to the amount of charge in the predetermined state of charge for each of the cells other than the reference cell; and a second processing unit setting the optimization target value to the amount of charge calculated by the first processing unit or a value corresponding thereto for each of the cells other than the reference cell.

In the particular configuration described above, the optimization target value is set to the amount of charge, or a value corresponding thereto, obtained by adding the difference between the amount of charge of the reference cell at the time and the amount of charge in the predetermined state of charge to the amount of charge in the predetermined state of charge for each of the cells other than the reference cell of the plurality of cells that form the assembled battery. Each of the cells other than the reference cell is discharged or charged in accordance with the optimization target value. As a result, the difference between the amount of charge after optimization and the amount of charge in the predetermined state of charge of each of the cells other than the reference cell is the same as the difference between the amount of charge and the amount of charge in the predetermined state of the reference cell. Therefore, when the assembled battery is discharged or charged thereafter, the states of charge of the plurality of cells are uniform in the predetermined state of charge.

In particular, the value corresponding to the amount of charge is a state of charge or a cell voltage. The second processing unit of the optimization target value setting unit converts the amount of charge calculated by the first processing unit into a state of charge or a cell voltage, and then sets the state of charge or the cell voltage obtained from the conversion as the optimization target value.

In the particular configuration described above, the target amount of charge calculated by the first processing unit is converted into the state of charge or the cell voltage. Here, the state of charge can be calculated by dividing the amount of charge by the full charging capacity and then multiplying the result by the value of 100. Also, the cell voltage and the state of charge have a certain relationship, and therefore when the relationship between the cell voltage and the state of charge is preliminary defined, the cell voltage can be derived from the state of charge in accordance with the relationship. After that, the state of charge or the cell voltage obtained by the conversion described above is set as the target optimization value.

More particularly, the amount of charge difference calculating unit calculates the amount of charge difference by subtracting the amount of charge in the predetermined state of charge from the current amount of charge for each of the cells that form the assembled battery. The optimization target value setting unit specifies a cell with the smallest amount of charge difference calculated by the amount of charge difference calculating unit as the reference cell from the plurality of cells that form the assembled battery.

According to the particular configuration described above, the optimization target value set for each of the cells other than the reference cell is an amount of charge, or a value corresponding thereto, which is below the amount of charge at the time. Therefore the optimization can be conducted only by discharging. Thus, only a discharging means is required and the structure is simple compared to a state of charge optimizing device equipped with both discharging means and charging means.

Further particularly, the amount of charge difference calculating unit calculates the difference between the current amount of charge and the amount of charge in the predetermined state of charge for each of the cells that form the assembled battery, and the state of charge optimizing device comprises:

an identifying unit identifying a maximum value and a minimum value from the amount of charge difference calculated by the amount of charge difference calculating unit;

a calculating unit calculating the difference between the maximum value and the minimum value identified by the identifying unit; and a determination unit determining whether or not a value calculated by the calculating unit is above a predetermined threshold, the optimization target value setting unit setting the optimization target value when the calculated value is determined to be above the predetermined threshold by the determination unit.

In the particular configuration described above, when the variation range of the difference between the current amount of charge and the amount of charge in the predetermined state of charge among the plurality of cells that form the assembled battery exceeds the predetermined threshold, the optimization target value is set and the optimizing process is conducted.

An assembled battery system according to the present invention comprises an assembled battery that includes a plurality of cells connected in series, and a state of charge optimizing device for optimizing the state of charge of each of the cells forming the assembled battery, and adopts the state of charge optimizing device of the present invention described above as the state of charge optimizing device.

As described, according to the state of charge optimizing device of the present invention and the assembled battery system including the state of charge optimizing device, it is possible to sufficiently elicit the performance of the assembled battery that includes the plurality of cells with different full charging capacities.

DETAILED DESCRIPTION OF THE INVENTION

The present invention implemented in a battery system of a hybrid car is described below on the basis of two embodiments.

First Embodiment

Figure 1:
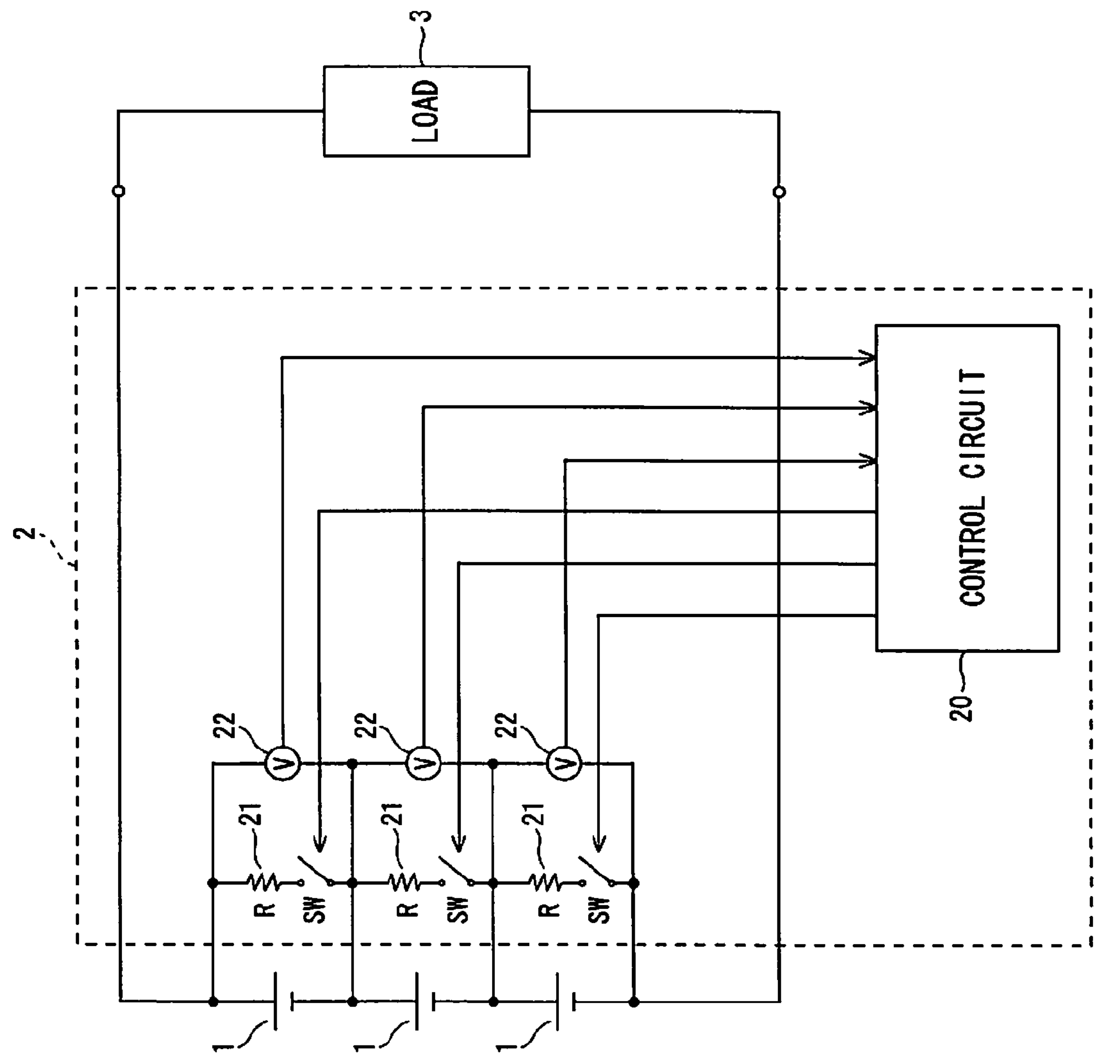
FIG. 1 is a block diagram illustrating a configuration of a battery system according to the present invention.

As shown in FIG. 1, the battery system according to the present invention comprises an assembled battery that includes a plurality of cells 1 which are lithium-ion secondary cells and connected in series (three cells in the example of the drawing), and a state of charge optimizing device 2 for optimizing the state of charge of the assembled battery. The electrical power can be supplied to a load 3 from the assembled battery.

A discharge circuit 21 which includes a resistor R and a switch SW connected to each other in series and a voltage measuring circuit 22 which measures the voltage across each cell (open-circuit voltage) are connected to both sides of each of the cells 1.

Values measured by each of the voltage measuring circuits 22 are supplied to a control circuit 20 and the control circuit 20 calculates optimization target voltage values as described below based on the measured values, and then controls discharging of each of the discharge circuits 21 based on the calculated optimization target voltage values and the values measured by the respective voltage measuring circuits 22.

In the optimizing process by the state of charge optimizing device 2, a reference cell is a cell with the smallest amount of charge difference among the plurality of cells that form the assembled battery. The amount of charge difference can be obtained by subtracting the amount of charge in a predetermined SOC from the amount of charge at the time. A target amount of charge is set for each of the cells other than the reference cell by adding the amount of charge difference of the reference cell to the amount of charge in the predetermined SOC. And then the optimization is conducted by discharging each of the cells other than the reference cell by the discharge circuit 21. Here, the predetermined SOC is set so that both the discharge characteristic and charge characteristic are favorable and well balanced. It is set to 50 percent in this embodiment.

Figure 2:
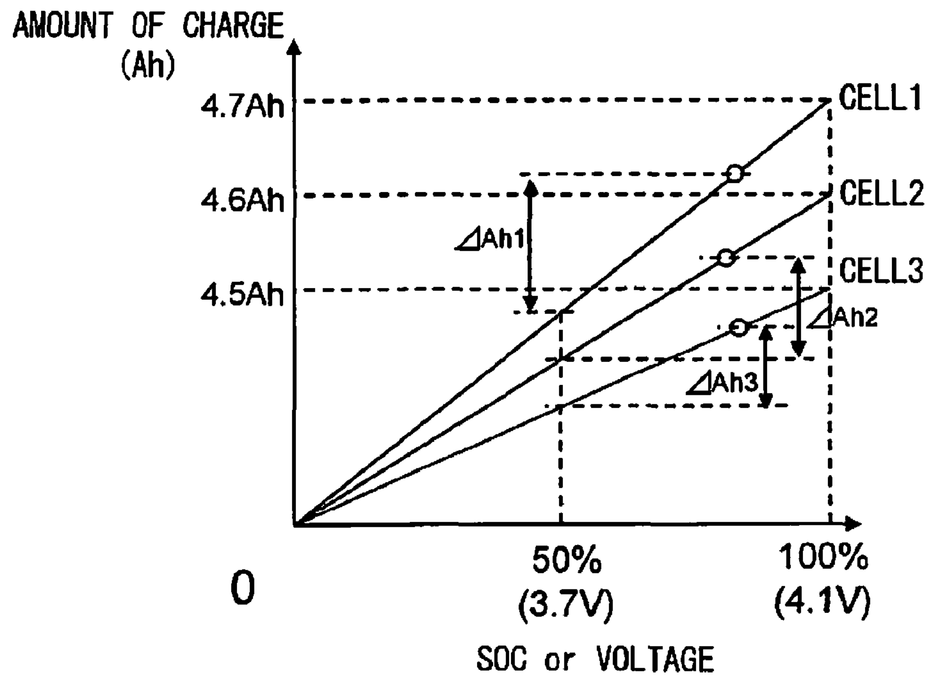
FIG. 2 is a graph which explains an optimizing process of the present invention.
Figure 3:
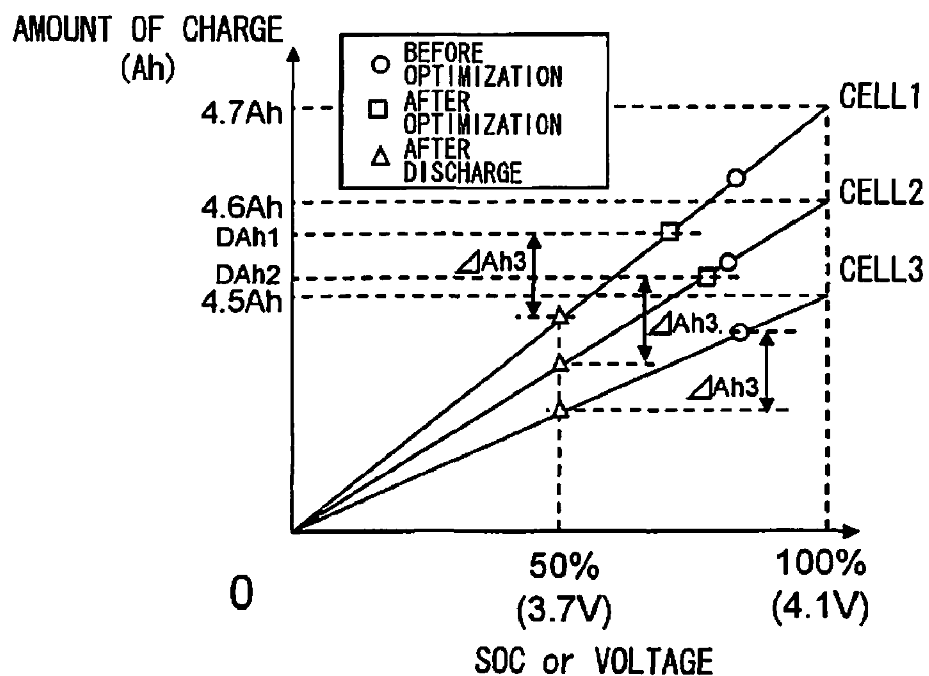
FIG. 3 is a graph which explains the effect of the optimizing process of the present invention.

For example, as shown in FIG. 2, with the assembled battery that includes three cells 1 to 3 having different full charging capacities, among the amount of charge differences of the three cells 1 to 3, ΔAh1, ΔAh2, and ΔAh3, when the cell 3 has the smallest amount of charge difference ΔAh3, the cell 3 is the reference cell. The target amounts of charge for the cell 1 and cell 2 are set to values DAh1 and DAh2 respectively, which are obtained by adding the amount of charge difference ΔAh3 to the amounts of charge in the SOC of 50 percent. And then, the optimization is conducted by discharging the cell 1 and cell 2 to the respective target amounts of charge. As a result, among the cells 1 to 3, the difference between the amount of charge after the optimizing process and the amount of charge when the SOC is 50 percent is uniform, whereby discharging of the assembled battery thereafter makes the SOCs of cells 1 to 3 uniform at 50 percent. When the assembled battery is further discharged or charged thereafter, the SOC of the cell 3, which has the smallest full charging capacity among the cells 1 to 3, will reach 0 percent or 100 percent the earliest.

Figure 4:
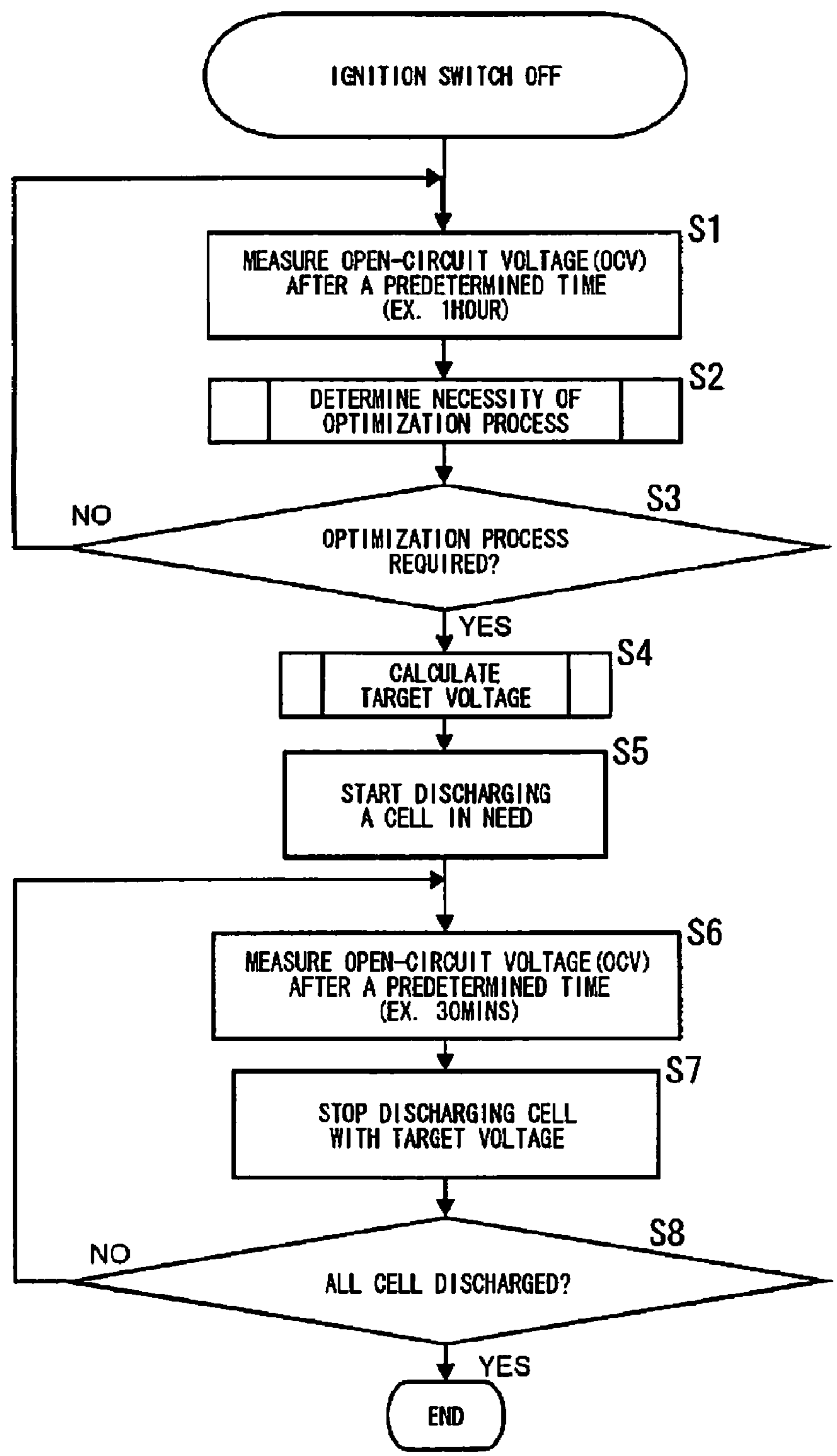
FIG. 4 is a flowchart showing the procedure of the optimizing process of the present invention.

FIG. 4 shows the procedure of the optimizing process conducted by the control circuit 20 of the state of charge optimizing device 2 when the ignition switch of a hybrid car is set to OFF. When the ignition switch is set to OFF first, in step S1, the control circuit 20 measures the open-circuit voltage of each of the cells that form the assembled battery after a predetermined period such as one hour. And then in step S2, it determines whether or not it is necessary to conduct the optimizing process. The particular procedure of the determining process in step S2 is to be described later. Subsequently in step S3, the control circuit 20 determines whether or not the optimizing process is determined to be necessary in step S2 and when it determines NO, the process returns to step S1.

In contrast, when it is determined that conducting the optimizing process is necessary and therefore determined YES in step S3, the control circuit 20 calculates an optimization target voltage in step S4, and then in step S5, starts discharging a cell with a voltage above the optimization target voltage calculated in step S4. The particular procedure of the optimization target voltage calculation process in step S4 is to be described later.

Subsequently in step S6, after a predetermined period, such as 30 minutes, the control circuit 20 measures the open-circuit voltage of each of the cells that form the assembled battery, and then in step S7, it terminates discharging the cell whose open-circuit voltage reaches the optimization target voltage calculated in step S4. Next, in step S8, it determines whether or not it has terminated discharging all the cells with a voltage above the optimization target voltage. When it determines NO, the process returns to step S6. When it terminates discharging all the cells thereafter, it determines YES in step S8 and terminates the procedure.

Figure 5:
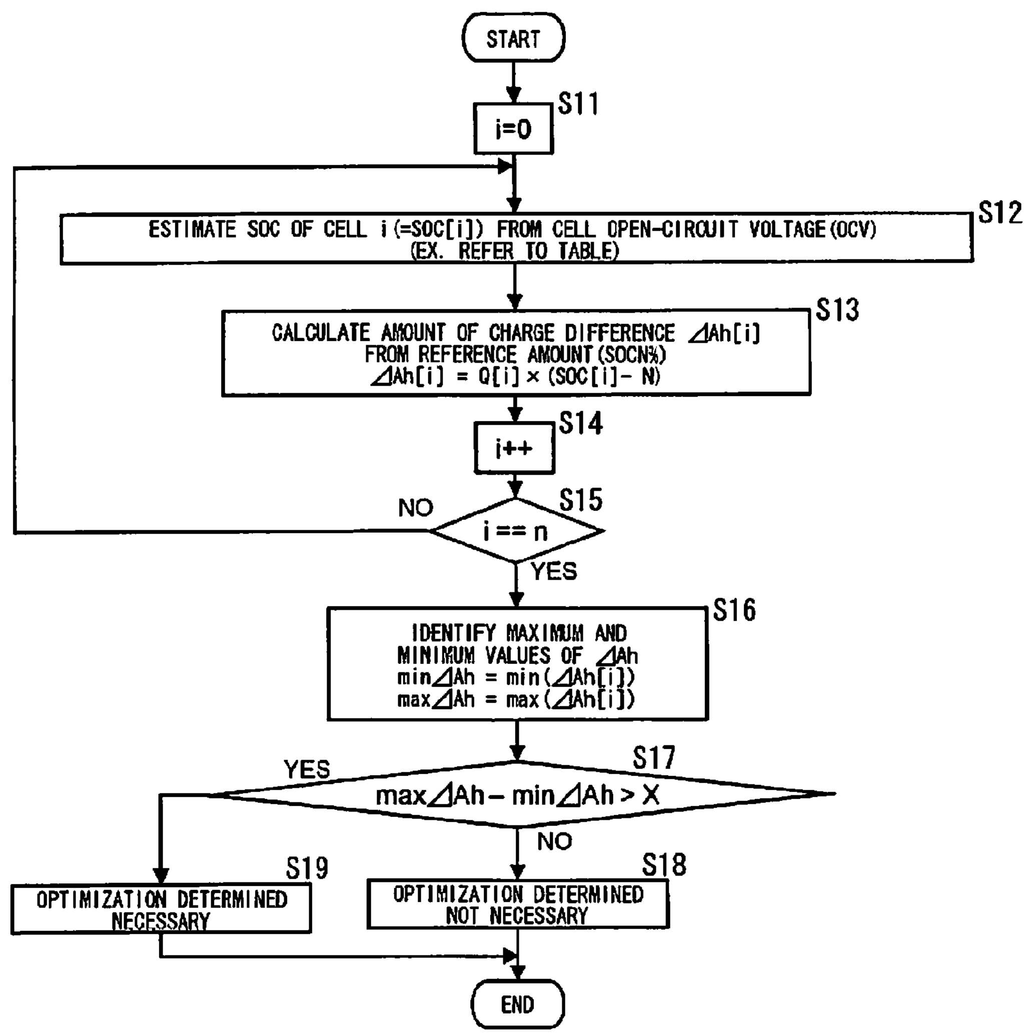
FIG. 5 is a flowchart showing the concrete procedure of a determining process of necessity of the optimizing by a state of charge optimizing device of the first embodiment.

FIG. 5 shows the concrete procedure of the determining process of necessity of optimization in step S2 described above. In the description below, the predetermined SOC is indicated as N percent and referred to as a reference SOC.

In the determining process, after initializing a cell number i to 0 in step S11, the control circuit 20 estimates the current SOC[i] of the cell with the cell number i from the open-circuit voltage thereof. Here, the SOC can be estimated from the open-circuit voltage by referring to a table stored in a memory, which shows the relationship between the open-circuit voltage and SOC.

Next in step S13, for the cell with the cell number i, the amount of charge difference ΔAh[i] between the current amount of charge and the amount of charge in the reference SOC (=N percent) is calculated from the full charging capacity Q[i] and the SOC[i] estimated in step S12 by using the formula 1 below.

$$\Delta Ah[i]=Q[i]\times(SOC[i]-N) \quad \text{Formula 1}$$

Subsequently in step S14, the cell number is increased by one, and then in step S15, the control circuit 20 determines whether or not the cell number i conforms to the number of cells n that form the assembled battery. When it determines NO, the process returns to step S12 and the procedure described above is repeated.

Thereafter, when the amount of charge difference ΔAh[i] between the current amount of charge and the amount of charge in the reference SOC (=N percent) is calculated for all the cells that form the assembled battery, the control circuit 20 determines YES in step S15, and then in step S16, identifies the minimum value min ΔAh and the maximum value max ΔAh from among the amount of charge differences ΔAh[i] calculated for all the cells that form the assembled battery.

Subsequently in step S17, the control circuit 20 determines whether or not the difference between the minimum value min ΔAh and the maximum value max ΔAh is above a predetermined threshold value X. When it determines NO, it determines that it is not necessary to conduct the optimizing process in step S18, and terminates the procedure described above, while when it determines YES, it determines that it is necessary to conduct the optimizing process in step S19 and terminates the procedure described above.

According to the procedure described above, when the SOCs of the plurality of cells that form the assembled battery vary a great deal and the difference between the minimum value min ΔAh and the maximum value max ΔAh calculated for the plurality of cells is above a predetermined threshold value X, it is determined that the optimizing process is necessary.

Figure 6:
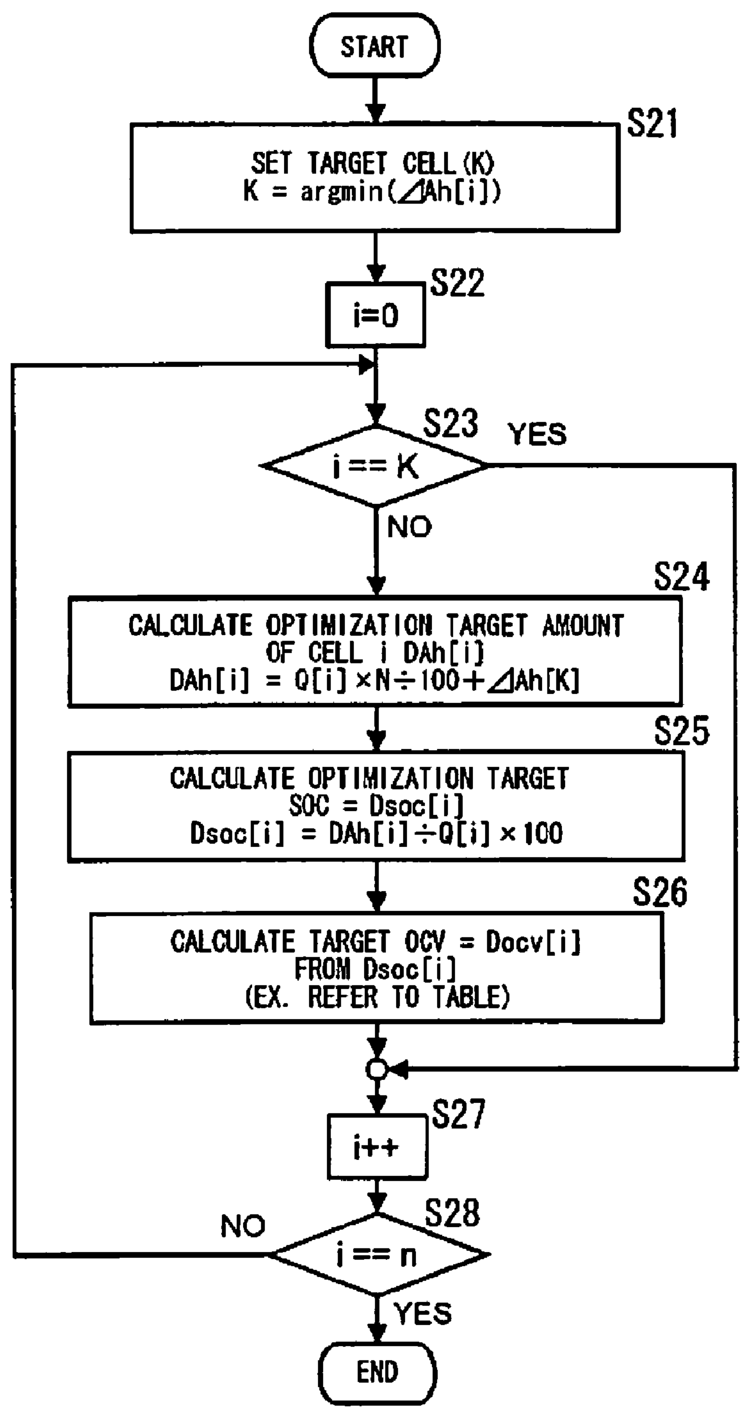
FIG. 6 is a flowchart showing the concrete procedure of an optimization target voltage value calculating process by the state of charge optimizing device.

FIG. 6 shows the concrete procedure of the optimization target voltage value calculating process in step S4 of FIG. 4. In this calculating process, first in step S21, the control circuit 20 specifies a cell from among the plurality of cells that form the assembled battery as a reference cell, and sets the cell number of the reference cell to the reference cell number K. Here, the cell with the smallest amount of charge difference ΔAh[i] calculated in step S13 of FIG. 5 is specified as the reference cell.

Next, after initializing the cell number i to 0 in step S22 of FIG. 6, the control circuit 20 determines whether or not the cell number i conforms to the reference cell number K in step S23. When it determines NO, the process proceeds to step S24 and the control circuit 20 calculates the optimization target amount of charge DΔAh[i] for the cell with the cell number i from the full charging capacity Q[i], the reference SOC (=N percent) and the amount of charge difference ΔAh [K] of the reference cell by using the formula 2 below. Here, (Q[i]×N÷100) in the formula 2 below is the amount of charge in the reference SOC.

$$\Delta DAh[i]=Q[i]\times N\div 100+\Delta Ah[K] \quad \text{Formula 2}$$

Subsequently in step S25, the control circuit 20 converts the optimization target amount of charge ΔDAh[i] calculated for the cell with the cell number i in step S24 into the SOC by using the formula 3 below.

$$DSOC[i]=\Delta DAh[i]\div Q[i] \quad \text{Formula 3}$$

Next in step S26, the control circuit 20 converts the optimization target SOC calculated for the cell with the cell number i in step S25 into a voltage value, and then the process proceeds to step S27. Here, the SOC can be converted into the voltage value by referring to a table stored in a memory, which shows the relationship between the SOC and the voltage value.

In addition, when the cell number i conforms to the cell number K and therefore it is determined YES in step S23, the process proceeds to step S27, bypassing steps 24 to 26.

After the cell number i is increased by one in step S27, the control circuit 20 determines whether or not the cell number i conforms to the number of cells n that form the assembled battery in step S28. When it determines NO, the process returns to step S23 and the procedure described above is repeated.

When the optimization target voltage value is calculated for all of the plurality of cells that form the assembled battery other than the reference cell, the control circuit 20 determines YES in step S28 and terminates the procedure.

According to the state of charge optimizing device 2 of the present invention, when the assembled battery is discharged or charged after the optimizing process as described above, the SOCs of the plurality of cells that form the assembled battery is uniform at 50 percent, where both the discharge characteristic and charge characteristic are favorable and well balanced. When the assembled battery is further discharged or charged thereafter, the cell with the smallest full charging capacity will reach 0 percent or 100 percent the earliest among the plurality of cells, thereby obtaining the maximum charging and discharging capacity of the assembled battery. Therefore, it is possible to maximally elicit the performance of the assembled battery that includes the plurality of cells having different full charging capacities.

Also, according to the state of charge optimizing device 2 of the present invention, it is possible to conduct the optimizing process regardless of the SOCs of the plurality of cells that form the assembled battery.

Further, among the plurality of cells that form the assembled battery, the cell with the smallest amount of charge difference, which is obtained by subtracting the amount of charge when the SOC is 50 percent from the amount of charge at the time, is specified as the reference cell. Therefore, the optimization target amount of charge calculated for each of the cells other than the reference cell is below the amount of charge at the time, whereby the optimizing process can be conducted by only discharging. Accordingly, only the discharge circuit 21 is required, and the configuration is simple compared to a state of charge optimizing device with both the discharge circuit and charge circuit.

Second Embodiment

While the state of charge optimizing device of the first embodiment is to conduct the optimizing process when the SOCs of the plurality of cells that form the assembled battery vary a great deal, the state of charge optimizing device of this embodiment is to conduct the optimizing process when the amount of charge of a cell of the plurality of cells that form the assembled battery falls below or exceeds a lower limit and an upper limit which are determined in accordance with the amount of charge of the cell with the smallest full charging capacity.

The configuration of the state of charge optimizing device in this embodiment is the same as that in the first embodiment except for the control circuit. Therefore, the description thereof is omitted. Also, the overall procedure of the optimizing process conducted by the control circuit of this embodiment is the same as the procedure described in the first embodiment shown in FIG. 4. Therefore, the description thereof is omitted.

The charging and discharging capacity of the assembled battery is determined by the cell with the smallest full charging capacity among the plurality of cells that form the assembled battery. In other words, in the case of charging the assembled battery, the maximum charging capacity is obtained when the SOC of the cell with the smallest full charging capacity reaches 100 percent the earliest, and in the case of discharging the assembled battery, the maximum discharging capacity is obtained when the SOC of the cell with the smallest full charging capacity reaches 0 percent the earliest.

In order for the SOC of the cell with the smallest full charging capacity to reach 0 percent or 100 percent the earliest, the amount of charge of the cells other than this cell should be within a range with a lower limit which is the amount of charge of the cell with the smallest full charging capacity and an upper limit which is the amount of charge obtained by adding the difference of the full charging capacities between the cell with the smallest full charging capacity and each of the cells other than this cell to the amount of charge of the cell with the smallest full charging capacity.

Figure 7:
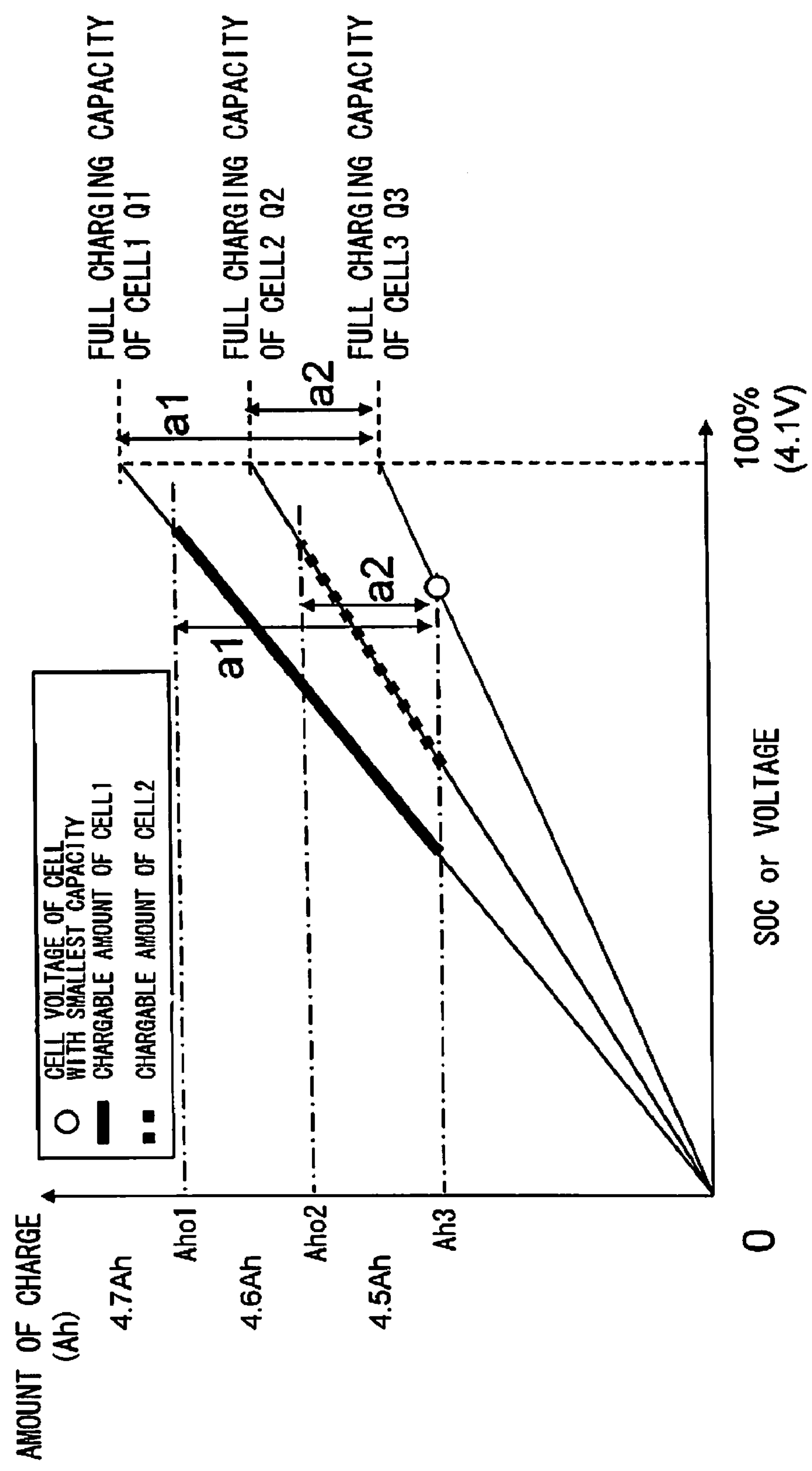
FIG. 7 is a graph which explains timing of conducting an optimizing process in a state of charge optimizing device of the second embodiment.

For example, in the case where the assembled battery includes three cells 1 to 3 as shown in FIG. 7, the amount of charge of the cell 1 should be within the range which is the amount of charge of the cell 3 Ah3 or above, and the amount of charge Aho1 or below, which is obtained by adding the difference a1 between the full charging capacities of the cell 1 and cell 3 to the amount of charge of the cell 3 Ah3. The amount of charge of the cell 2 should be within the range which is the amount of charge of the cell 3 Ah3 or above, and the amount of charge Aho2 or below, which is obtained by adding the difference a2 between the full charging capacities of the cell 2 and cell 3 to the amount of charge of the cell 3 Ah3.

Accordingly, in the state of charge optimizing device of this embodiment, the optimizing process is conducted when the amount of charge of any of the plurality of cells that form the assembled battery deviates the range described above.

Figure 8:
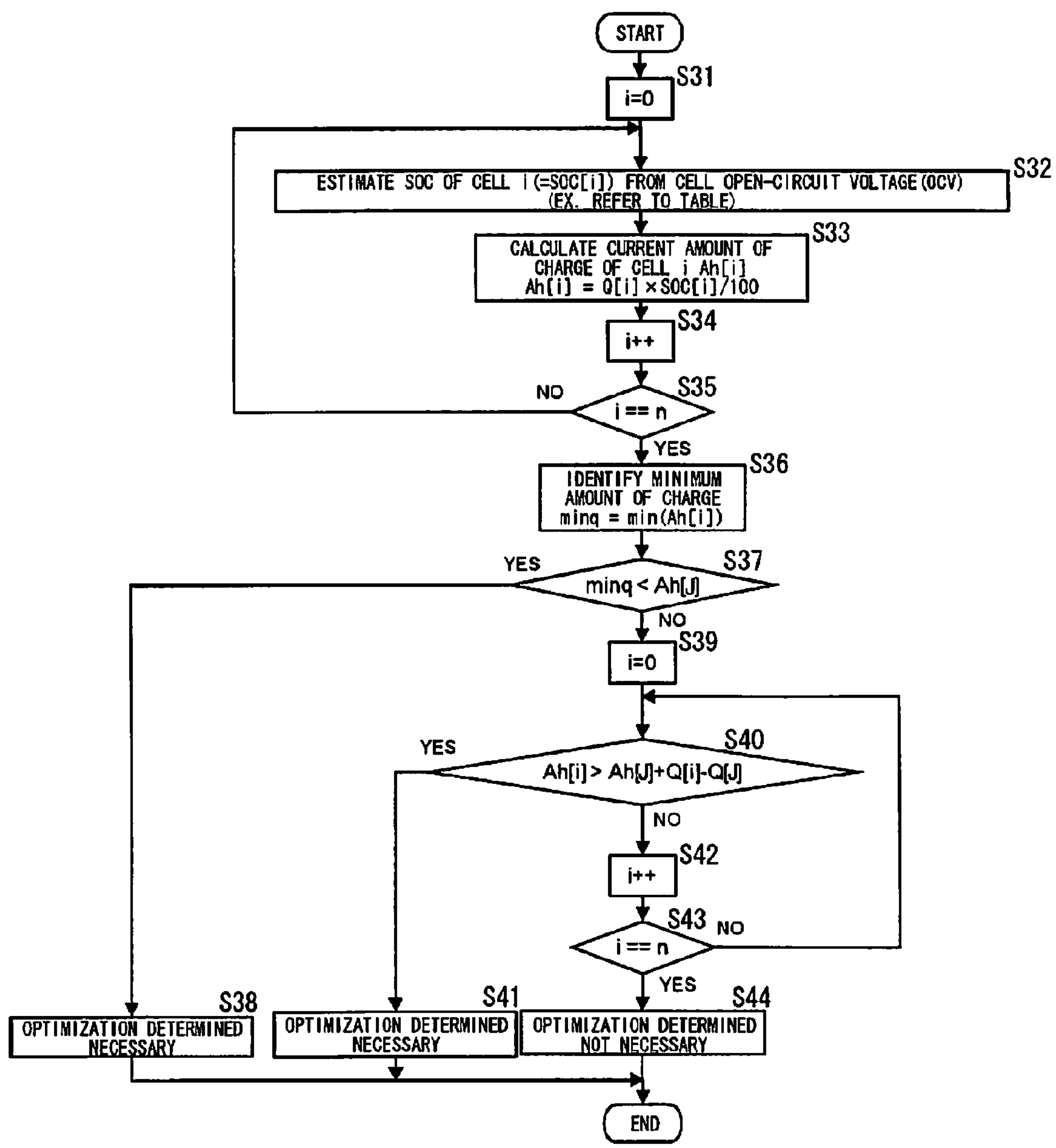
FIG. 8 is a flowchart showing the concrete procedure of a determining process of necessity of the optimizing by the state of charge optimizing device.

FIG. 8 shows the concrete procedure of a determining process of necessity of optimization conducted by the control circuit of this embodiment. In this determining process, first in step S31, the cell number i is initialized to zero, and then the current SOC[i] of the cell is estimated from the open-circuit voltage of the cell with the cell number i in step S32. Here, the SOC can be estimated by referring to a table stored in a memory, which shows the relationship between the open-circuit voltage and the SOC.

Next in step S33, for the cell with the cell number i, the current amount of charge Ah[i] is calculated from the full charging capacity Q[i] and the SOC[i] estimated in step S32, by using the formula 4 below.

$$Ah[i]=Q[i]\times SOC[i]/100 \quad \text{Formula 4}$$

Subsequently in step S34, the cell number i is increased by one, and the control circuit determines whether or not the cell number i conforms to the number of cells n that form the assembled battery in step S35. When it determines NO, the process returns to step S32 and the procedure described above is repeated.

After that, when the current amounts of charge Ah[i] of all the cells that form the assembled battery are calculated, it determines YES in step S35, and next in step S36, identifies the minimum value minq from among the calculated current amounts of charge of all the cells that form the assembled battery.

Subsequently in step S37, it determines whether or not the minimum value minq identified in step S36 is below the current amount of charge of the cell with the smallest full charging capacity, Ah[J] (J is the cell number of the cell with the smallest full charging capacity). When it determines YES, it determines that the optimizing process is necessary in step S38 and terminates the procedure.

When the minimum value minq is the current amount of charge of the cell with the smallest full charging capacity Ah[J] or above and therefore it determines NO in step S37, it initializes the cell number i to zero in step S39, and then in step S40, it determines whether or not the current amount of charge of the cell with the cell number i Ah[i] is above the upper limit which is obtained by adding the difference between the full charging capacities of the cell with the cell number 0 and the cell with the smallest full charging capacity (Q[i]−Q[J]) to the current amount of charge of the cell with the smallest full charging capacity Ah[J]. When it determines NO, the cell number i is increased by one in step S42, and then it determines whether or not the cell number i conforms to the number of cells n in step S43. When it determines NO, the process returns to step S40 and the procedure described above is repeated.

During repeating the procedure described above, when it determines YES in step S40, it determines that the optimizing process is necessary in step S41 and terminates the procedure.

In contrast, when it determines NO in step S40 for all the cells that form the assembled battery, finally it determines YES in step S43 and then in step S44, it determines that the optimizing process is not necessary and terminates the procedure.

In accordance with the procedure described above, in the case where the amount of charge of any of the plurality of cells that form the assembled battery is below the lower limit, or above the upper limit, the control circuit determines that optimizing process is necessary.

In contrast, in the case where the amount of charge of none of the plurality of cells that form the assembled battery is below the lower limit, or above the upper limit, the control circuit determines that optimizing process is not necessary.

Figure 9:
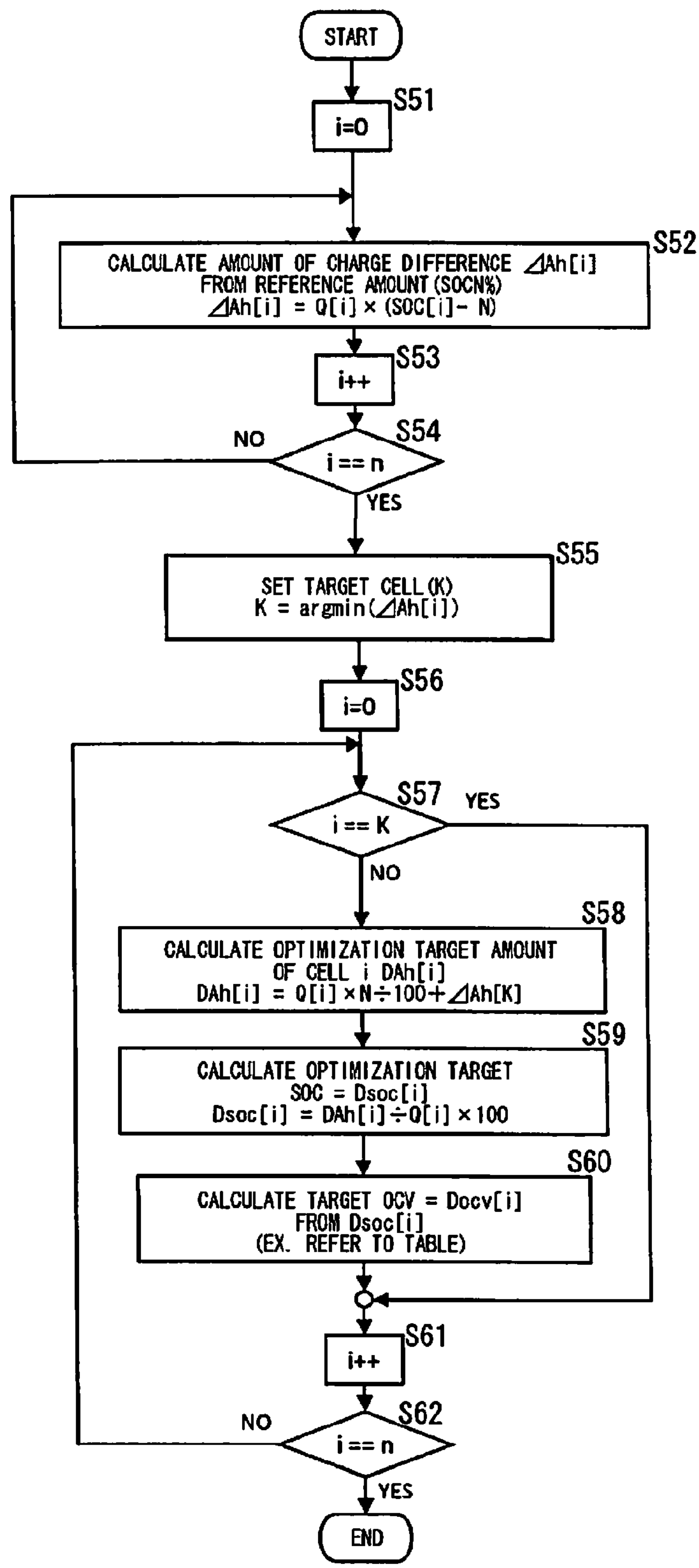
FIG. 9 is a flowchart showing the concrete procedure of an optimization target voltage value calculating process by the state of charge optimizing device.
Figure 10:
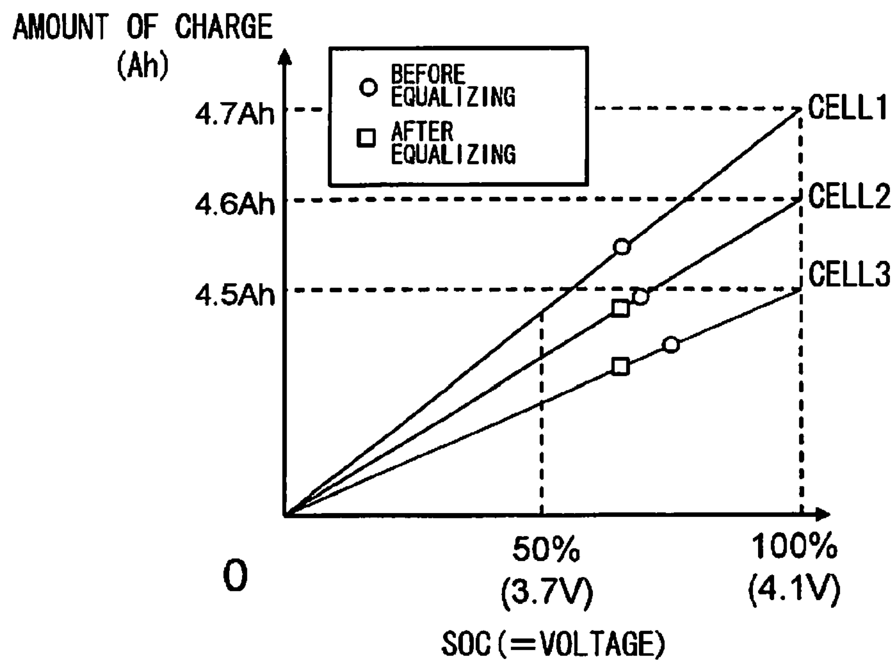
FIG. 10 is a graph which explains a conventional equalizing process.
Figure 11:
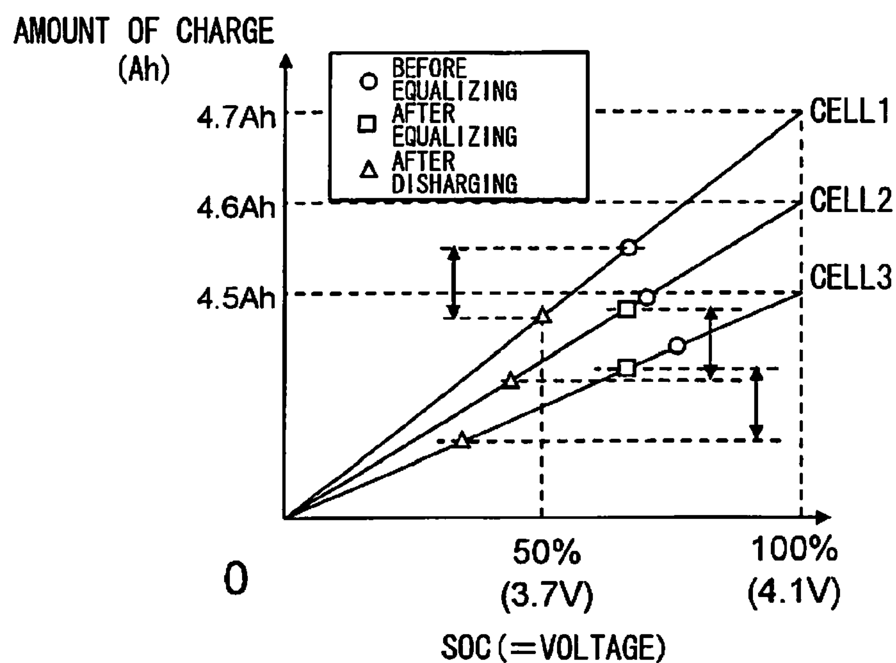
FIG. 11 is a graph which explains a problem of the conventional equalizing process.
Figure 12:
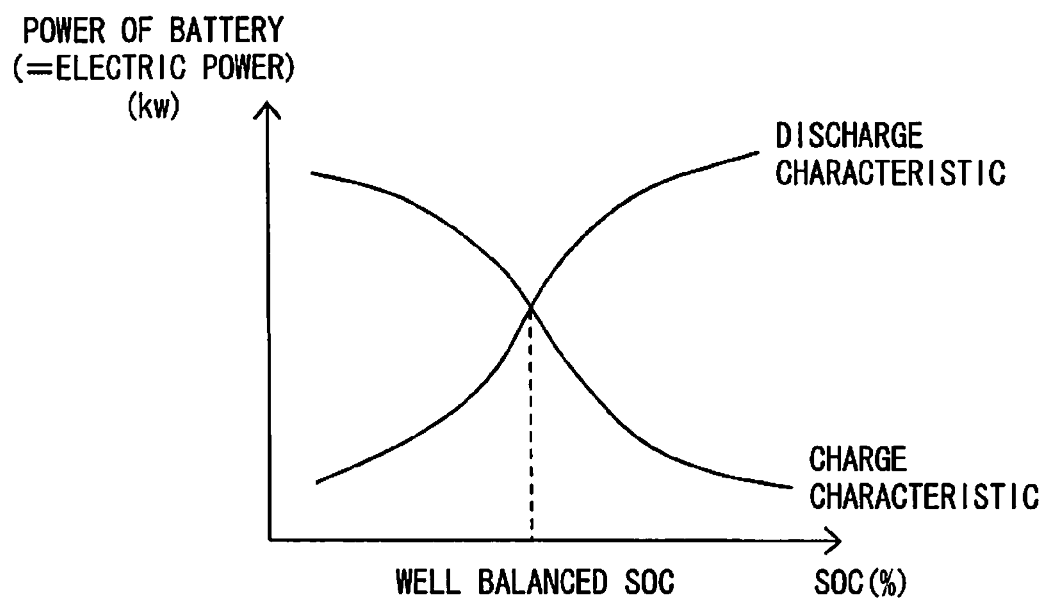
FIG. 12 is a graph showing a charge and discharge characteristic of an assembled battery.

FIG. 9 shows the concrete procedure of an optimization target voltage value calculating process conducted by the control circuit of this embodiment. In this calculating process, after initializing the cell number i to zero in step S51, the control circuit, in step S52, calculates the amount of charge difference ΔAh[i] between the current amount of charge and the amount of charge in the reference SOC (=N percent) from the full charging capacity Q[i] and the SOC[i] estimated in step S32 of FIG. 8, by using the formula 1 stated above.

Subsequently, after increasing the cell number i by one in step S53, the control circuit determines whether or not the cell number i conforms to the number of cells n that form the assembled battery in step S54. When it determines NO, the process returns to step S52 and the procedure described above is repeated.

Thereafter, when the amount of charge difference ΔAh[i] between the current amount of charge and the amount of charge in the reference SOC (=N percent) is calculated for all the cells that form the assembled battery, it determines YES in step S54 and the process proceeds to step S55.

And then, by conducting the procedure from steps S55 to S62, the optimization target voltage value is calculated for all the cells that form the assembled battery other than the reference cell. Here, the procedure from steps S55 to S62 is the same as that from steps S21 to S28 shown in FIG. 6 and conducted by the control circuit of the first embodiment. Therefore the description thereof is omitted.

In accordance with the state of charge optimizing device of this embodiment, since the optimizing process is conducted with the timing described above, it is possible to prevent the SOCs of the cells other than the cell with the smallest full charging capacity from reaching 0 percent or 100 percent the earliest. Also, as in the first embodiment, when the assembled battery is discharged or charged after the optimizing process, all the SOCs of the plurality of cells become 50 percent. When the assembled battery is further discharged or charged thereafter, the SOC of the cell with the smallest full charging capacity reaches 0 percent or 100 percent the earliest, thereby eliciting the performance of the assembled battery maximally.

In addition, in the embodiments above, the optimizing process is conducted based on the optimization target voltage value converted from the optimization target amount of charge. However, it is also possible to adopt the configuration in which the optimizing process is conducted based on the optimization target amount of charge, or the configuration in which the optimizing process is conducted based on the optimization target SOC.

Also, in the embodiments above, the optimization is conducted by discharging each cell until the cell voltage becomes equivalent to the optimization target voltage value in a state where the ignition switch of a hybrid car is set to OFF. However, it is also possible to adopt a configuration in which the optimization is conducted during charging and discharging the assembled battery. In such a configuration, an integration value of the charging or discharging amount since the target value is set is referred to as P (when it is charging, P>0, and when it is discharging, P<0), and the optimization target amount of charge DAh is kept modified using the formula (DAh+P). Accordingly discharging or charging is conducted until the amount of charge, or the value corresponding thereto, of each cell becomes the optimization target amount of charge or the value corresponding thereto.

Further, in the embodiments above, the optimization is conducted by only discharging the assembled battery, specifying a cell with the smallest the value as the reference cell. Here, the value is obtained by subtracting the amount of charge when the SOC is 50 percent from the amount of charge at the time. However, it is also possible to adopt the configuration in which the optimization is conducted by only charging the assembled battery, specifying a cell with the greatest value as the reference cell, or the configuration in which optimization is conducted by discharging and charging the assembled battery, specifying a cell other than the cells with the smallest and greatest values as the reference cell. The values here are obtained in the same manner as described above.

In the embodiments above, for each of the cells other than the reference cell, the optimization target amount of charge is calculated by adding the difference between the current amount of charge and the amount of charge in the predetermined SOC to the amount of charge in the predetermined SOC. However, it is possible to obtain the optimization target amount of charge by calculating the difference between the current amount of charge and the amount of charge in the predetermined SOC for all the cells that form the assembled battery, and then calculating the average value of the calculated differences to be added to the amount of charge in the predetermined SOC for each of the cells.

Also, in the embodiments above, the predetermined SOC is set to 50 percent. However, it is not limited to 50 percent, and it is possible to set the SOC to any value which can sufficiently elicit the performance of the assembled battery depending on the configuration or characteristic of the assembled battery. For example, with the state of charge optimizing device of the assembled battery in which discharging should be stopped at X1 percent (X1>0) and charging should be stopped at X2 percent (X2<100), the predetermined SOC (=N percent) is set to the value obtained by calculating with the formula 5 below.

$$N=(X1+X2)/2 \quad \text{Formula 5}$$

Still further, in the embodiments above, each cell is discharged separately. However, it is also possible to adopt a configuration in which the optimization target value is set for a plurality of cells which are one module, and charging and/or discharging is conducted for every module to conduct the optimization. In a state of charge optimizing device for an assembled battery that includes many cells, adopting such a configuration can realize a small circuit size.

Furthermore, the state of charge optimizing device of the present invention can be used for not only the assembled battery comprising lithium ion secondary cells, but also other kinds of assembled batteries.

What is claimed is:

1. A state of charge optimizing device for optimizing a state of charge of each cell of a plurality of cells which are connected in series to form an assembled battery, said device comprising a charging or discharging unit capable of discharging or charging each cell, wherein the device conducts optimization of the state of charge of each cell in such a manner that the difference between the amount of charge after said discharging or charging each cell and the amount of charge in a predetermined state of charge becomes uniform among the plurality of cells, when said discharging or charging is conducted in a part or all of the plurality of cells and an amount of charge difference calculating unit calculating the difference between the current amount of charge and the amount of charge in the predetermined state of charge for at least one of the plurality of cells;

an optimization target value setting unit setting an optimization target value in accordance with the amount of charge difference calculated by the amount of charge difference calculating unit for each cell of a part or all of the plurality of cells; and an optimizing processing unit making the charging and discharging unit conduct charging or discharging in accordance with the set optimization target value for each cell of a part or all of the plurality of cells when the optimization target value is set;

wherein the optimization target value setting unit sets the optimization target value for each of the cells other than a reference cell which is the at least one cell of the plurality of cells, the optimization target value setting unit comprising:

a first processing unit adding the amount of charge difference of the reference cell calculated by the amount of charge difference calculating unit to the amount of charge in the predetermined state of charge for each of the cells other than the reference cell; and a second processing unit setting the optimization target value to the amount of charge calculated by the first processing unit or a value corresponding thereto for each of the cells other than the reference cell.

2. The state of charge optimizing device according to claim 1, wherein the value corresponding to the amount of charge is a state of charge or a cell voltage, and the second processing unit of the optimization target value setting unit converts the amount of charge calculated by the first processing unit into a state of charge or a cell voltage and then sets the state of charge or the cell voltage obtained from the conversion as the optimization target value.

3. The state of charge optimizing device according to claim 1, wherein the amount of charge difference calculating unit calculates the amount of charge difference by subtracting the amount of charge in the predetermined state of charge from the current amount of charge for each of the cells that form the assembled battery, and the optimization target value setting unit specifies a cell with the smallest amount of charge difference calculated by the amount of charge difference calculating unit as the reference cell from the plurality of cells that form the assembled battery.

* * * * *